United States Patent
Bailey et al.

(10) Patent No.: US 7,602,531 B2
(45) Date of Patent: Oct. 13, 2009

(54) HALFTONE EDGE ENHANCEMENT FOR PRODUCTION BY AN IMAGE FORMING DEVICE

(75) Inventors: James Ray Bailey, Georgetown, KY (US); Khageshwar Thakar, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 570 days.

(21) Appl. No.: 11/277,190

(22) Filed: Mar. 22, 2006

(65) Prior Publication Data

US 2007/0223044 A1    Sep. 27, 2007

(51) Int. Cl.
*H04N 1/405* (2006.01)
(52) U.S. Cl. .................... 358/3.15; 358/3.27
(58) Field of Classification Search ............ 358/1.9, 358/2.1, 3.15, 3.27, 3.06, 3.26; 382/199, 382/200, 254, 260, 266, 275, 308
See application file for complete search history.

(56) References Cited

U.S. PATENT DOCUMENTS

| | | |
|---|---|---|
| 5,483,351 A | 1/1996 | Mailloux et al. |
| 5,696,845 A | 12/1997 | Loce et al. |
| 5,787,208 A | 7/1998 | Oh et al. |
| 6,057,935 A | 5/2000 | Freeman |
| 6,141,460 A | 10/2000 | Amer et al. |
| 6,275,304 B1 | 8/2001 | Eschbach et al. |
| 6,297,889 B1 | 10/2001 | Loce et al. |
| 6,463,175 B1 | 10/2002 | Lee |
| 6,655,861 B2 | 12/2003 | Yamakawa |
| 6,728,004 B2 | 4/2004 | Loce et al. |
| 6,928,196 B1 | 8/2005 | Bradley et al. |
| 7,443,543 B2 * | 10/2008 | Kaburagi ............ 358/3.15 |
| 2002/0135790 A1 * | 9/2002 | Ishiguro ............ 358/1.9 |
| 2002/0181024 A1 * | 12/2002 | Morimoto et al. ...... 358/3.15 |

* cited by examiner

*Primary Examiner*—Thomas D Lee
*Assistant Examiner*—Stephen M Brinich
(74) *Attorney, Agent, or Firm*—Coats and Bennett, PLLC (57) ABSTRACT

Digital images that are produced by an image forming device may be processed using an edge enhancement technique to reduce the effects of halftone color depth reductions. For each element in the original image, certain detail elements are classified by examining the magnitude of pixel intensity gradients between elements of interest in a first window applied at each element and other elements in the first window. If a first predetermined condition is satisfied, those elements locations are stored. After halftoning, a morphological filter may be applied to the same element locations in the halftone image to enhance the halftone image.

18 Claims, 9 Drawing Sheets

HALFTONE EDGE ENHANCEMENT FOR PRODUCTION BY AN IMAGE FORMING DEVICE

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates generally to digital image processing. More specifically, the present invention relates to a method for reducing artifacts at object edges in halftone images.

2. Description of the Related Art

When printing images on an image forming device, discrete units of monochrome colorants (e.g., ink, toner) are placed onto a media sheet. Color imaging devices use halftone screens to combine a finite number of colors and produce, what appears to the human eye, many shades of colors. The halftone process converts different tones of an image into single-color dots of varying size and varying frequency. In general, halftone screens of as few as three colors may suffice to produce a substantial majority of visible colors and brightness levels. For many color imaging devices, these three colors comprise cyan, magenta, and yellow. In many cases, a fourth color, black, is added to deepen dark areas and increase contrast. In order to print the different color components in a four color process, it is necessary to separate the color layers, with each color layer converted into halftones. In monochrome printers, black halftones are used to represent varying shades of gray.

Before printing, the full color or grayscale images are converted into the requisite number of halftone images. This process entails a reduction in color depth. That is, the number of colors that are used to represent discrete units in an image is reduced from some relatively large value to one-bit per unit. As an example, a grayscale image comprising 256 shades of gray, may be converted from eight bits per pixel into a halftone image comprising one-bit per pixel (or smaller unit defined by a halftone screen). A general problem with the halftone operation is degradation in image quality. Various methods of reducing the image color depth are known, including "Nearest Color" and "Ordered Dither" techniques. "Error Diffusion" is another technique that is commonly used to scale down the image resolution. Error diffusion, as the name implies, works by locally distributing or diffusing known errors that result from the resolution change. In other words, the errors are diffused among a few pixels, which may produce a slight bleeding or fraying effect. This problem is particularly noticeable at distinct boundaries between light and dark regions in an original image.

The problem becomes even more pronounced when printing a scanned image. Scanning often produces blurred edges as a result of factors such as mechanical and optical limitations, sensor resolution, and quantization errors. Some scanners also implement anti-aliasing or image filtering to soften the edges of objects such as text. Thus, for devices such as All-In-One or Multifunction printers capable of direct copying, the edges of detailed objects may be distorted twice. First, the edges may be blurred by the scan process. Second, the blurred edges produced by the scanner may be frayed during the halftone process where the color depth is reduced for reproduction by single-color dots.

Some conventional techniques used to compensate for the blurred or frayed edges include spatial domain filtering or unsharp mask filters applied to the color or grayscale image prior to halftoning. However, these techniques may tend to reduce the size of objects as they work to enhance the contrast on both the light and dark sides of an object. Furthermore, these conventional techniques may not compensate for halftone artifacts such as the fraying of halftone edges.

SUMMARY

The present invention is directed to a technique that processes digital images for improved production by an image forming device. The technique comprises an edge enhancement to reduce the effects of halftone color depth reductions. The original digital image may be a grayscale image or a color image. For each element in the original image, certain detail elements are classified by examining the magnitude of pixel intensity gradients between elements of interest in a first window applied at each element and other elements in the first window. If a first predetermined condition is satisfied, those element locations are stored. The classification may identify detail elements located on a common side of an object boundary, character boundary, or color transition. After halftoning, a morphological filter may be applied to the same element locations in the halftone image to enhance the halftone image. The morphological filter may comprise a dilation filter to turn halftone elements ON or an erosion filter to turn halftone elements OFF.

DETAILED DESCRIPTION

Figure 1:
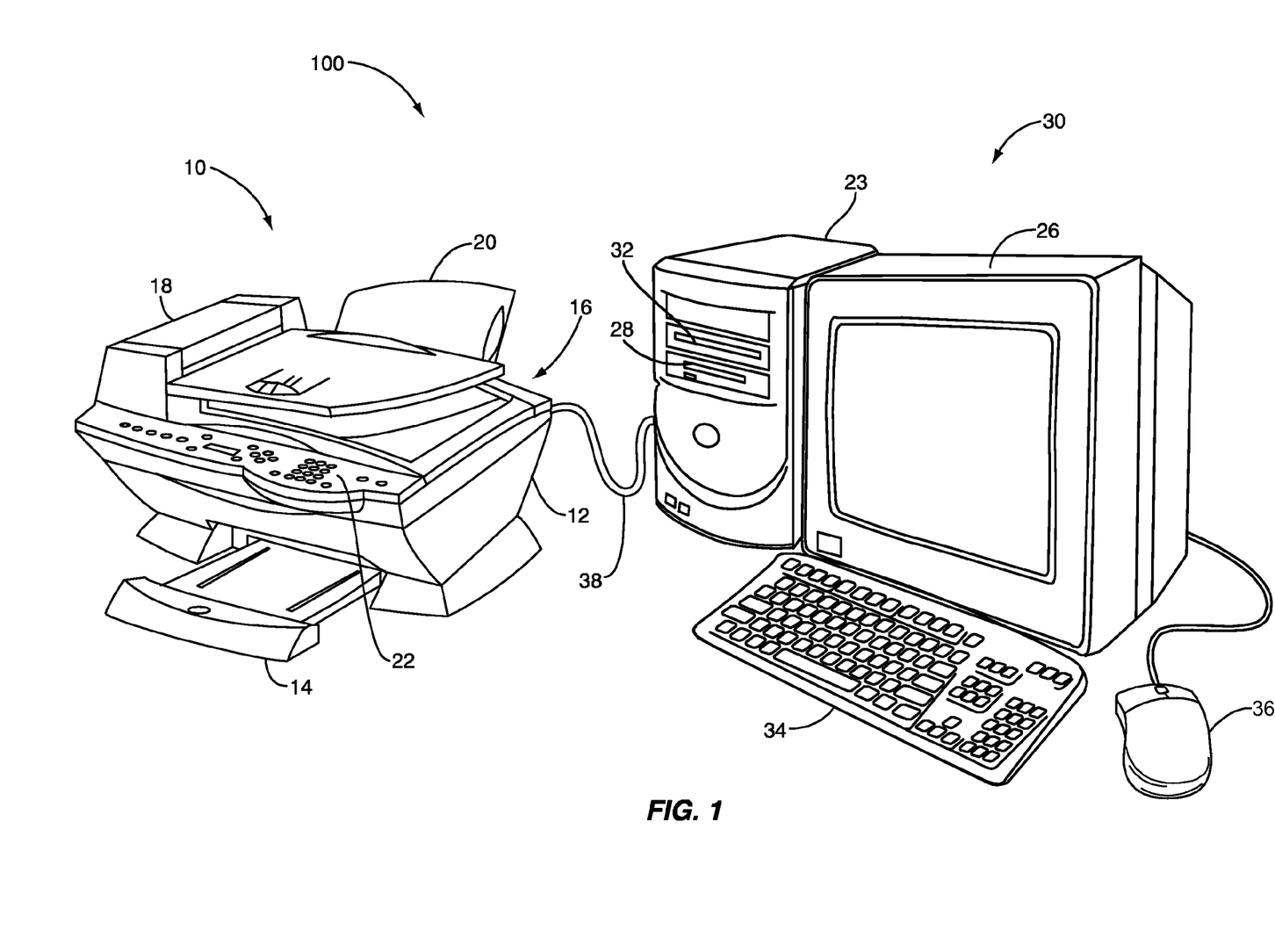
FIG. 1 is a perspective view of an exemplary computing system in which embodiments of the halftone image enhancement technique may be implemented.

Embodiments disclosed herein are directed to devices and methods for improving the visible quality of detailed features such as object edges that are reproduced by an image forming device. In certain instances, halftone images contain artifacts such as frayed edges that are produced as a result of a halftone process. The embodiments described below reduce or eliminate these artifacts while maintaining the overall size of objects of which the edges form a part. The processing techniques disclosed herein may be implemented in a variety of computer processing systems. For instance, the disclosed halftone edge enhancement may be executed by a computing system 100 such as that generally illustrated in FIG. 1. The exemplary computing system 100 provided in FIG. 1 depicts one embodiment of a representative image forming device, such as a multifunction or All-In-One (AIO) device, indicated generally by the numeral 10 and a computer, indicated generally by the numeral 30. A multifunction device 10 is shown, but other image forming devices, including laser printers and ink-jet printers are also contemplated. Similarly, a desktop computer 30 is shown, but other conventional computers, including laptop and handheld computers are also contemplated. In the embodiment shown, the image forming device 10 comprises a main body 12, at least one media tray 20, a flatbed (or feed-through as known in the art) scanner 16 comprising a document handler 18, a media output tray 14, and a user interface panel 22. The illustrated image forming device 10 is adapted to perform multiple home or business office functions such as printing, faxing, scanning, and copying. Consequently, the image forming device 10 includes further internal components not visible in the exterior view shown in FIG. 1 (but see FIG. 2 and the corresponding discussion below).

The exemplary computing system 100 shown in FIG. 1 also includes an associated computer 30, which may include a CPU tower 23 having associated internal processors, memory, and circuitry (also not shown in FIG. 1, but see FIG. 2) and one or more external media drives. For example, the CPU tower 23 may have a floppy disk drive (FDD) 28 or other magnetic drives and one or more optical drives 32 capable of accessing and writing computer readable or executable data on discs such as CDs or DVDs. The exemplary computer 30 further includes user interface components such as a display 26, a keyboard 34, and a pointing device 36 such as a mouse, trackball, light pen, or, in the case of laptop computers, a touchpad or pointing stick.

An interface cable 38 is also shown in the exemplary computing system 100 of FIG. 1. The interface cable 38 permits one- or two-way communication between the computer 30 and the image forming device 10. When coupled in this manner, the computer 30 may be referred to as a host computer for the image forming device 10. Certain operating characteristics of the image forming device 10 may be controlled by the computer 30 via printer or scanner drivers stored and executed on the computer 30. For instance, print jobs originated on the computer 30 may be printed by the image forming device 10 in accordance with resolution and color settings that may be set on the computer 30. Where a two-way communication link is established between the computer 30 and the image forming device 10, information such as scanned images or incoming fax images may be transmitted from the image forming device 10 to the computer 30.

With regard to the edge enhancement techniques disclosed herein, certain embodiments may permit operator control over image processing to the extent that a user may select whether or not to implement the edge enhancement. In other embodiments, a user may adjust certain thresholds or other operating parameters for the edge enhancement algorithms. Accordingly, the user interface components such as the user interface panel 22 of the image forming device 10 and the display 26, keyboard 34, and pointing device 36 of the computer 30 may be used to control various options or processing parameters. As such, the relationship between these user interface devices and the processing components is more clearly shown in the functional block diagram provided in FIG. 2.

Figure 2:
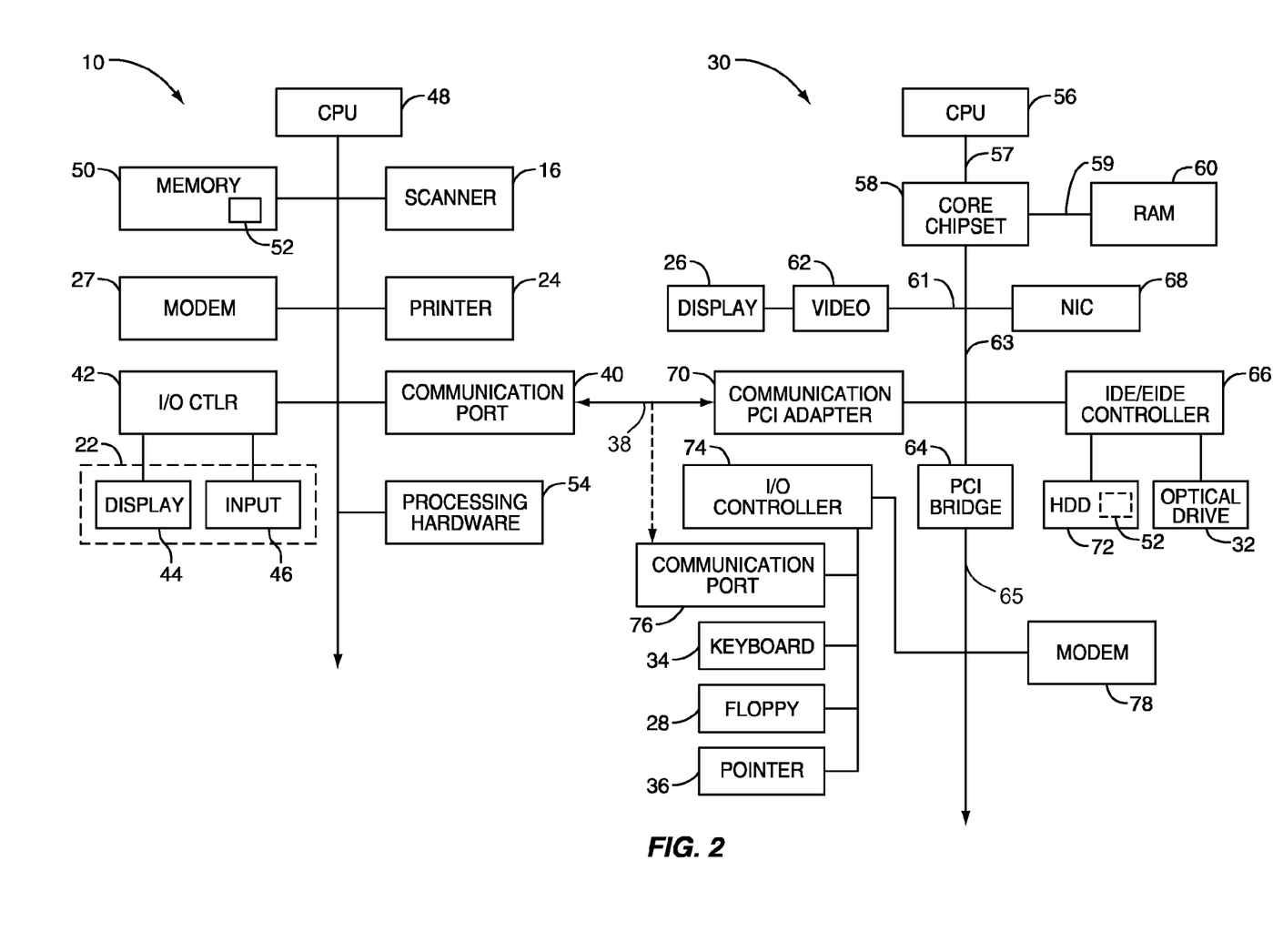
FIG. 2 is a functional block diagram of an exemplary computing system in which embodiments of the halftone image enhancement technique may be implemented.

FIG. 2 provides a simplified representation of some of the various functional components of the exemplary image forming device 10 and computer 30. For instance, the image forming device 10 includes the previously mentioned scanner 16 as well as an integrated printer 24, which may itself include a conventionally known ink jet or laser printer with a suitable document transport mechanism. Interaction at the user interface 22 is controlled with the aid of an I/O controller 42. Thus, the I/O controller 42 generates user-readable graphics at a display 44 and interprets commands entered at a keypad 46. The display 44 may be embodied as an LCD display and keypad 46 may be an alphanumeric keypad. Alternatively, the display and input functions may be accomplished with a composite touch screen (not shown) that simultaneously displays relevant information, including images, while accepting user input commands by finger touch or with the use of a stylus pen (not shown).

The exemplary embodiment of the image forming device 10 also includes a modem 27, which may be a fax modem compliant with commonly used ITU and CCITT compression and communication standards such as the ITU-T series V recommendations and Class 1-4 standards known by those skilled in the art. The image forming device 10 may also be coupled to the computer 30 with an interface cable 38 coupled through a compatible communication port 40, which may comprise a standard parallel printer port or a serial data interface such as USB 1.1, USB 2.0, IEEE-1394 (including, but not limited to 1394*a* and 1394*b*) and the like.

The image forming device 10 may also include integrated wired or wireless network interfaces. Therefore, communication port 40 may also represent a network interface, which permits operation of the image forming device 10 as a standalone device not expressly requiring a host computer 30 to perform many of the included functions. A wired communication port 40 may comprise a conventionally known RJ-45 connector for connection to a 10/100 LAN or a 1/10 Gigabit Ethernet network. A wireless communication port 40 may comprise an adapter capable of wireless communications with other devices in a peer mode or with a wireless network in an infrastructure mode. Accordingly, the wireless communication port 40 may comprise an adapter conforming to wireless communication standards such as Bluetooth®, 802.11x, 802.15 or other standards known to those skilled in the art. A wireless communication protocol such as these may obviate the need for a cable link 38 between the multifunction device and the host computer 30.

The image forming device 10 may also include one or more processing circuits 48, system memory 50, which generically encompasses RAM and/or ROM for system operation and code storage as represented by numeral 52. The system memory 50 may suitably comprise a variety of devices known to those skilled in the art such as SDRAM, DDRAM, EEPROM, Flash Memory, or a fixed hard disk drive. Those skilled in the art will appreciate and comprehend the advantages and disadvantages of the various memory types for a given application.

Additionally, the image forming device 10 may include dedicated image processing hardware 54, which may be a separate hardware circuit, or may be included as part of other processing hardware. For example, the edge enhancement algorithms described below may be implemented via stored program instructions for execution by one or more Digital Signal Processors (DSPs), ASICs or other digital processing circuits included in the processing hardware 54. Alternatively, the edge enhancement algorithms may be implemented as program code 52 stored in memory 50 and executed by some combination of processor 48 and processing hardware 54. The processing hardware 54 may further include programmed logic devices such as PLDs and FPGAs. In general, those skilled in the art will comprehend the various combinations of software, firmware, and hardware that may be used to implement the various embodiments described herein.

FIG. 2 also shows functional components of the exemplary computer 30, which comprises a central processing unit ("CPU") 56, core logic chipset 58, system random access memory ("RAM") 60, a video graphics controller 62 coupled to the aforementioned video display 26, a PCI bus bridge 64, and an IDE/EIDE controller 66. The single CPU block 56 may be implemented as a plurality of CPUs 56 in a symmetric or asymmetric multi-processor configuration.

In the exemplary computer 30 shown, the CPU 56 is connected to the core logic chipset 58 through a host bus 57. The system RAM 60 is connected to the core logic chipset 58 through a memory bus 59. The video graphics controller 62 is connected to the core logic chipset 58 through an advanced graphics port ("AGP") bus 61 or a peripheral component bus 63, such as a PCI bus or PCI-X bus. The PCI bridge 64 and IDE/EIDE controller 66 are connected to the core logic chipset 58 through the primary PCI bus 63. A hard disk drive ("HDD") 72 and the optical drive 32 discussed above are coupled to the IDE/EIDE controller 66. Also connected to the PCI bus 63 are a network interface card ("NIC") 68, such as an Ethernet card, and a PCI adapter 70 used for communication with the image forming device 10 or other peripheral device. Thus, PCI adapter 70 may be a complementary adapter conforming to the same or similar protocol as communication port 40 on the image forming device 10. As indicated above, PCI adapter 70 may be implemented as a USB or IEEE 1394 adapter. The PCI adapter 70 and the NIC 68 may plug into PCI connectors on the computer 30 motherboard (not illustrated). The PCI bridge 64 connects over an EISA/ISA bus or other legacy bus 65 to a fax/data modem 78 and an input-output controller 74, which interfaces with the aforementioned keyboard 34, pointing device 36, floppy disk drive ("FDD") 28, and optionally a communication port such as a parallel printer port 76. As discussed above, a one-way communication link may be established between the computer 30 and the image forming device 10 or other printing device through a cable interface indicated by dashed lines in FIG. 2.

Relevant to the edge enhancement techniques disclosed herein, digital images may be obtained from a number of sources in the computing system 100 shown. For example, hard copy images may be scanned by scanner 16 to generate a digital or hardcopy reproduction. Alternatively, the digital images may be stored on fixed or portable media and accessible from the HDD 72, optical drive 32, floppy drive 28, accessed from portable media attached to the communication port 40 of image forming device 10, or accessed from a network (e.g., a LAN or the Internet) by NIC 68 or modem 78. Further, as mentioned above, the various embodiments of the edge enhancement techniques may be implemented in a device driver, program code 52, or software that is stored in memory 50, on HDD 72, on optical discs readable by optical disc drive 32, on floppy disks readable by floppy drive 28, or from a network accessible by NIC 68 or modem 78. Hardware implementations may include dedicated processing hardware 54 that may be embodied as a microprocessor executing embedded firmware instructions or high powered logic devices such as VLSI, FPGA, and other CPLD devices. Those skilled in the art of computers and network architectures will comprehend additional structures and methods of implementing the techniques disclosed herein.

Figure 3:
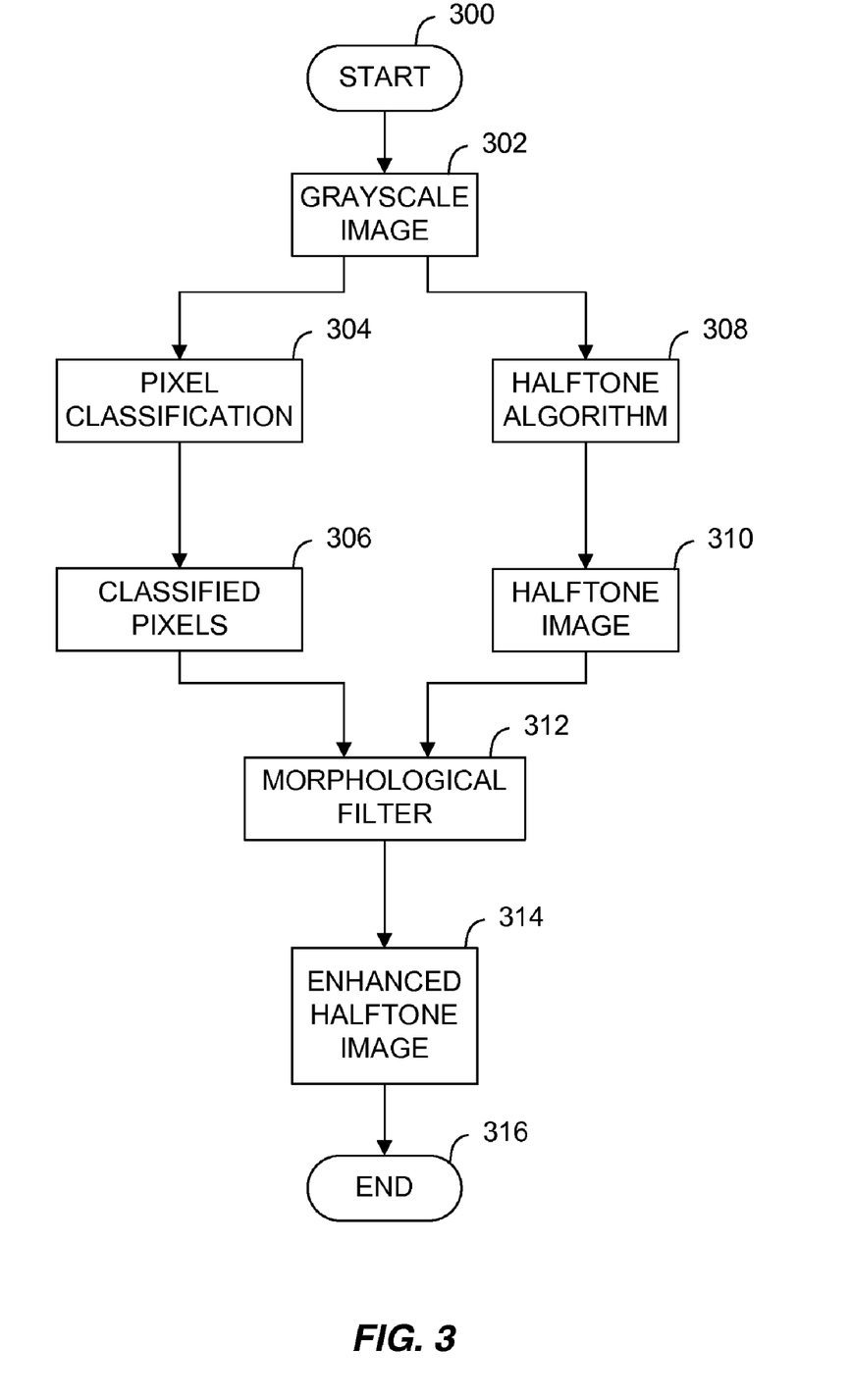
FIG. 3 is a flow diagram illustrating one embodiment for carrying out the halftone image enhancement technique.

An image from one of the above-described sources may be duplicated or printed at the image forming device 10. FIG. 3 illustrates one embodiment of the edge enhancement technique as applied in a color or monochrome image forming device such as the exemplary multifunction device 10. This embodiment begins at step 300 with a grayscale image 302 that is printed by the image forming device 10. A grayscale image is an image in which the intensity value of each pixel can be represented by a single value. The total number of values used to represent the grayscale image 302 may vary, but some common color depths include 8-bits per pixel or 24-bits per pixel, though smaller or larger color depths are possible. Images of this sort may be composed of shades of the color grey, varying from black at the weakest intensity to white at the strongest. It should be understood however, that a grayscale image 302 may be an individual color separation (e.g., cyan, magenta, yellow) of a full-color image. Therefore, the process steps outlined in FIG. 3 may be performed for each color separation in a color image forming device 10.

Two different operations are performed on the grayscale image 302. Process step 304 represents a pixel classification step where detail objects are identified. In one embodiment, the pixel classification step 304 identifies pixels that are located at or near the edge of an object, such as a text character. Alternatively, the edge may be located at or near the transition from a first color to a second color. The process by which the edge enhancement algorithm identifies these edge pixels is described in greater detail below. Once these pixels are identified, their position is stored as a list 306 of pixels that have been affirmatively classified as edge pixels.

In a subsequent or parallel operation, a conventional halftone algorithm 308 is applied to the grayscale image 302 to reduce the color depth and produce a monochrome halftone image 310. The halftone algorithm 308 may also use a suitable halftone screen frequency in accordance with the capabilities of the image forming device 10. The reduction in color depth may be implemented using known techniques such as Nearest Color, Ordered Dither, and Error Diffusion methods. The Error Diffusion methods may further implement known variations that include Floyd-Steinberg, Burkes, Stucki, or Sierra dithering methods.

In step 312, the edge enhancement algorithm filters the halftone image 310 based on the aforementioned pixel classification. The technique uses mathematical morphology operations, including erosion and dilation, to modify the spatial structure of image data. Those skilled in the art will also recognize that other morphological operations, including OPEN operations or CLOSE operations may be implemented as well. Other spatial filters may be applied as well, including high-pass sharpening filters or low-pass blurring filters. In certain embodiments, erosion is performed by observing a K×K window around a pixel of interest and assigning the smallest value within the window to that pixel. This has the effect of shrinking or eroding the image features. In contrast, dilation is performed by observing a K×K window around a pixel and assigning the largest value within the window to that pixel. This has the effect of growing or dilating the image features. These techniques are used in filtering the halftone image 310 prior to printing. Further, the morphology operations are applied to pixels that are classified as edge pixels according to the list generated at steps 304 and 306. The morphology operations are applied at these edge pixels to reduce or eliminate fraying effects that are produced as a result of the halftone algorithm 308. A more detailed description of the morphology filters 312 is described below.

Figure 4:
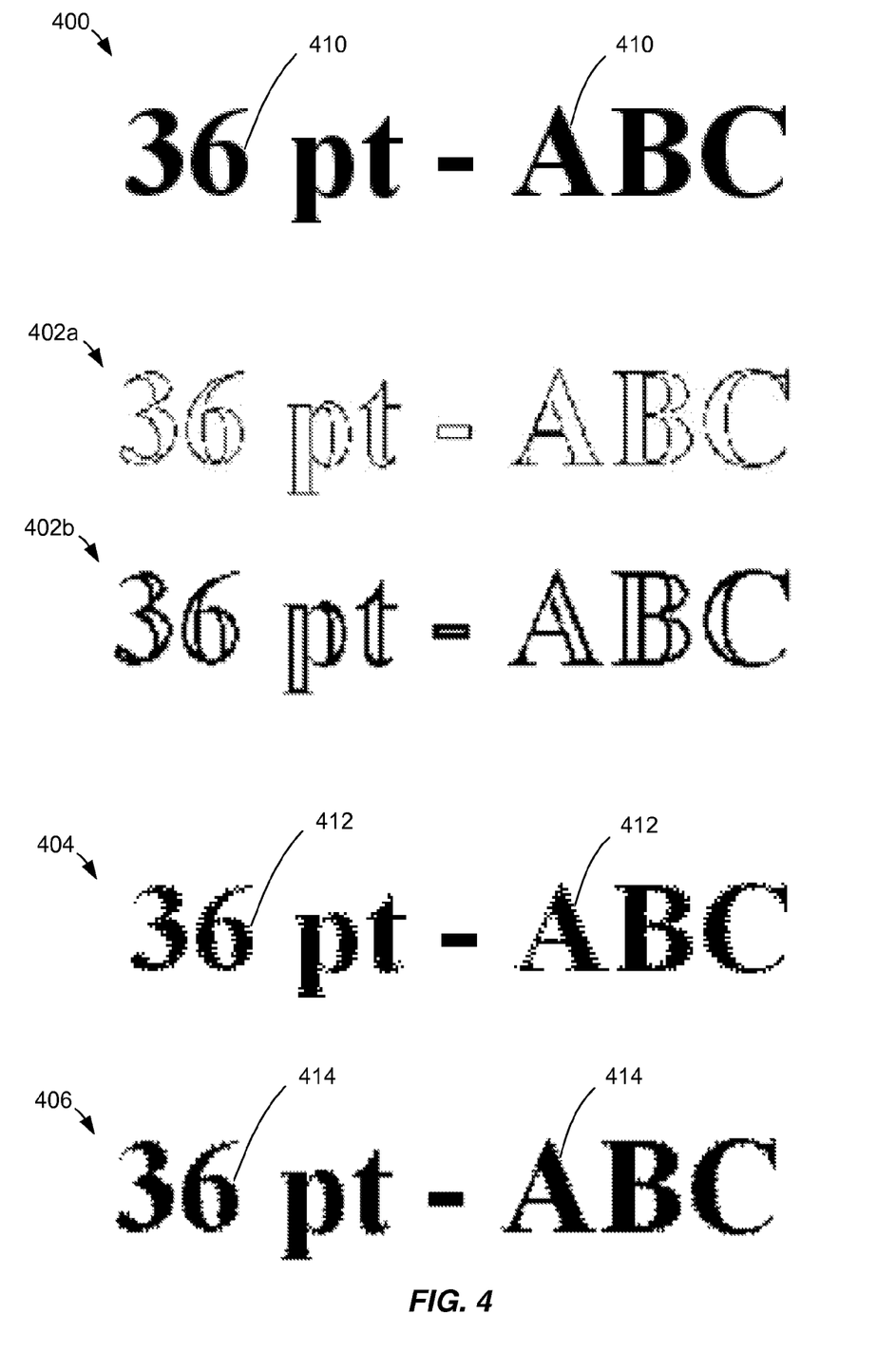
FIG. 4 includes a sequence of images corresponding to different process steps shown in the halftone image enhancement technique.

FIG. 4 illustrates a sequence of images corresponding to different process steps shown in the flow diagram of FIG. 3. Image 400 represents a grayscale representation of the alphanumeric string "36 pt-ABC." This image 400 includes a plurality of objects having edges that become frayed after conversion to a halftone image. Accordingly, the edge enhancement algorithm may be employed to improve the visual quality of the edges that appear in the printed image. As indicated above, the edge enhancement algorithm is not limited to the enhancement of character edges. In fact, the embodiments disclosed herein may be used to enhance other object edges. More generically, the edge enhancement algorithm may be employed to improve transitions from a first shade/color to a second shade/color within a grayscale or color image. Further, the image 400 may be obtained from a number of sources as described above. In at least one embodiment, the image 400 is obtained by scanning a hardcopy original at the AIO image forming device 10. In this particular illustration, the grayscale image 400 includes text where the character objects are anti-aliased to soften the edges. Thus, the edges 410 of the characters are blurred and/or represented by varying shades of gray (or other color).

Images 402a and 402b represent edge pixels that are classified according to the pixel classification step 304 from FIG. 3. Note that in FIG. 3, these edge pixels are represented in the form of images 402a, 402b. However, the edge pixels may be stored simply as a list or array of pixel locations identified by coordinate image positions. Different pixel classifications steps 304 are used to produce the images 402a, 402b. In the illustrated examples, image 402a comprises fewer edge pixels than image 402b. For example, image 402a may comprise pixels only at the outermost edge (transition from dark to light) of the characters from image 400. In contrast, image 402b may comprise more edge pixels extending two or more pixels inward from the character edges. Methods for classifying these edge pixels are described in greater detail below.

Image 404 represents a halftone representation of the original image 400 that is produced by the halftone algorithm 308. In this particular embodiment, the edges 412 of the halftone image 404 are dispersed or frayed. In certain halftone processes, the fraying is a by-product of an effort to reproduce the blurred anti-aliased edges in the original image 400. That is, individual dots in the halftone image 404 are dispersed to recreate the various shades that appear in the original image 400. The same type of fraying may also appear at other edges, including edges represented as stair-stepped lines and curved edges. Fraying may also arise at edges that are distorted through other image processing such as resizing or resolution changes.

Image 406 illustrates the effects of applying the morphological filter from step 312 of FIG. 3. Specifically, a dilation filter is applied to the edge pixels represented in image 402a or 402b. During this process, light-colored pixels are converted to dark-colored pixels if at least one other pixel in the vicinity of the light-colored pixel is also dark. This morphological filter uses a window of a predetermined size to analyze the state of neighboring pixels relative to the pixel of interest. The morphological filters are described in greater detail below. The end result of applying the morphological filter at step 312 of FIG. 3 is that much of the fraying that is present in image 404 is removed. The edges 414 of the characters shown in image 406 are substantially more uniform than the edges 412 in image 404.

Figure 5:
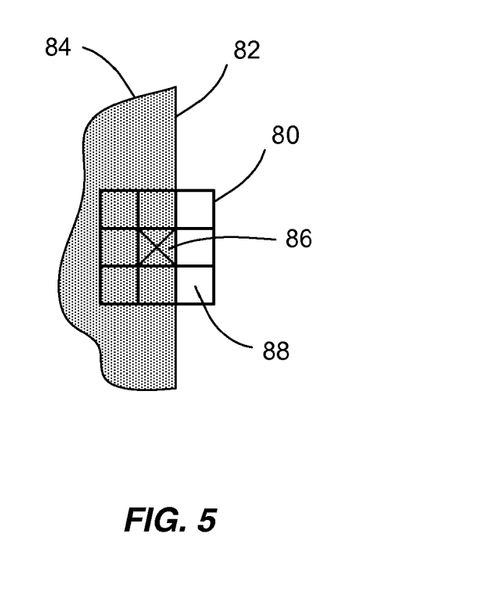
FIG. 5 is a schematic illustration of a window that is used to classify image elements on a given side of a color intensity transition according to one embodiment.

As discussed above, the edge enhancement algorithm identifies edge pixels in a grayscale image so that a morphological filter can be applied to those edge pixels in the corresponding halftone image. FIG. 5 illustrates a K×K window 80 that is used to identify edge pixels at a dark to light transition 82. This transition 82 may occur at the perimeter of an object 84. In the embodiment shown, the window 80 is a 3×3 window, though other sizes may be used. In the 3×3 window 80, a center cell 86 is positioned over a pixel of interest in the image and the intensity of the pixel under the center cell 86 is compared to image pixels lying under cells 88 disposed about the perimeter of the window 80.

Figure 6:
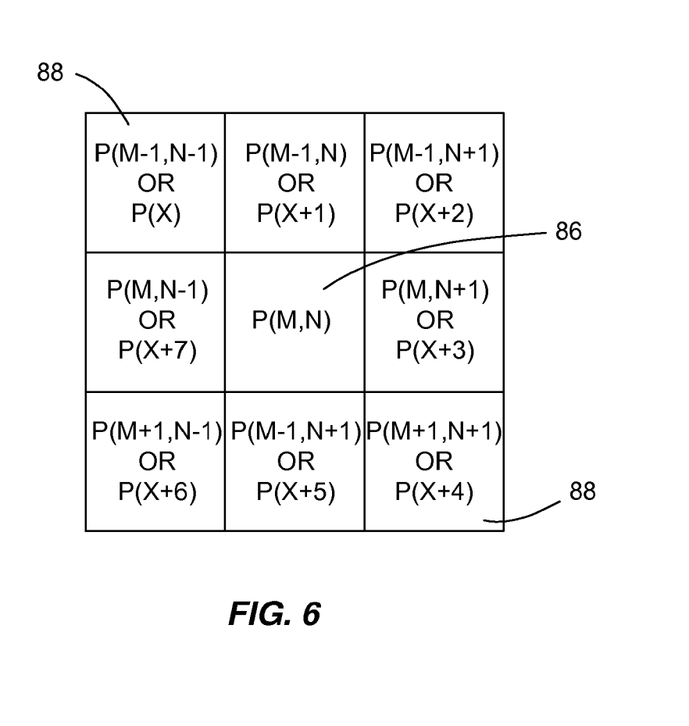
FIG. 6 is a schematic of a representative window that is used to classify image elements on a given side of a color intensity transition according to one embodiment.

The cells 86, 88 within the window 80 may be labeled according to the convention shown in FIG. 6. For the 3×3 window 80 shown, the center cell 86 is surrounded by eight perimeter cells 88. The perimeter cells may be identified relative to the position (M,N) of the center cell 86. That is, the coordinate positions for the perimeter cells 88 vary from the central position (M,N) within a range between −1 and +1. Alternatively, the perimeter cells 88 may simply be numbered in ascending order. Thus, in the embodiment shown, the perimeter 88 cells may be identified by labels ranging from P(0) to P(7) beginning with the perimeter cell that is in the upper left hand corner of the window 80. Obviously, other naming conventions may be used. Also, the numerical ranges for the perimeter cell 88 labels will change if larger windows 80 are used.

Figure 7:
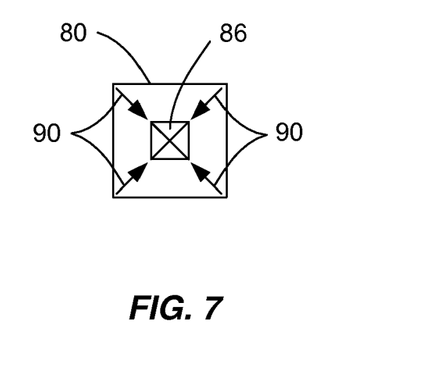
FIG. 7 is a schematic illustrating a color intensity gradient within a window that is used to classify image elements on a given side of a color intensity transition according to one embodiment.

The edge enhancement algorithms classify pixels as edge pixels if there is a measurable change in intensity between the center cell 86 and perimeter cells. Furthermore, the edge enhancement algorithm may identify unidirectional intensity variations as indicated by the illustration provided in FIG. 7. In general, the edge enhancement algorithm looks for either light-to-dark transitions or dark-to-light transitions so as to identify edge pixels on either the dark side or the light side of an edge 82. In one embodiment, the edge enhancement algorithm identifies dark-to-light transitions as identified by the arrows 90 in FIG. 7. Thus, if the center cell 86 is positioned over a dark pixel, the edge enhancement algorithm will classify that dark pixel as an edge pixel if the cells 88 at the perimeter of the window 80 are sufficiently light as compared to the dark pixel under the center cell 86. Note that in the present example, a light pixel positioned under the center cell 86 does not get labeled as an edge pixel since a light-to-dark transition represents an intensity gradient in the direction opposite to arrows 90 in FIG. 7. This approach may identify edge pixels at a common side of a transition from dark-to-light pixels. One advantage of this approach is that the edge pixels remain within the size boundary of the original objects of which the edges form a part. Therefore, a subsequent dilation operation will not tend to increase the size of the object 84.

Figure 8:
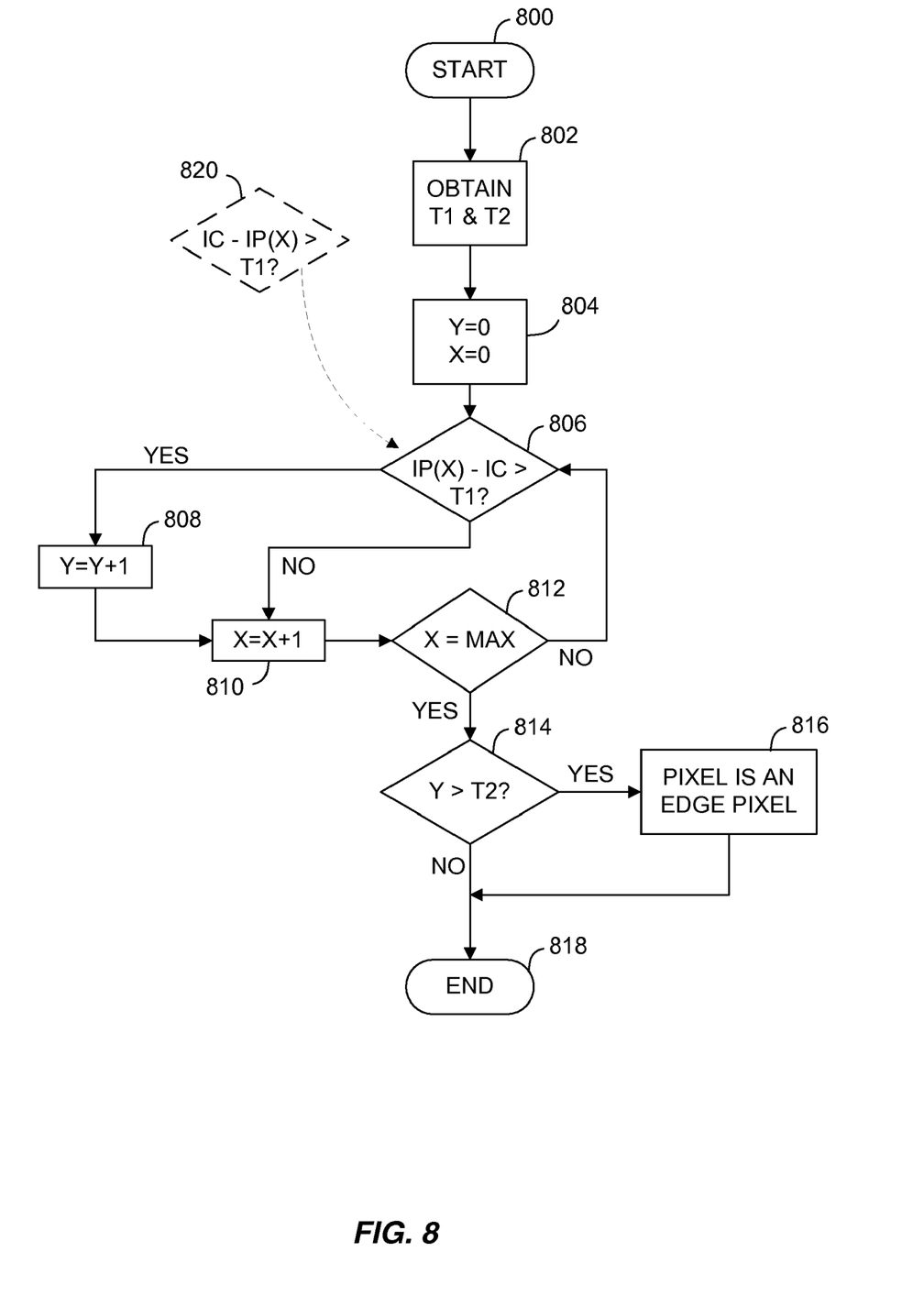
FIG. 8 shows a flow diagram illustrating a classification technique used to identify image elements on a given side of a color intensity transition according to one or more embodiments.

FIG. 8 shows a flow diagram outlining this edge classification technique (corresponding to the process step 304 from FIG. 3). The pixel classification technique starts at step 800 and initially proceeds to obtain process parameters T1 and T2 in step 802. The first parameter T1 defines an intensity difference between a pixel under the center cell 86 in window 80 and a pixel under a perimeter cell 88 in that same window 80. As a non-limiting example, if an image is an 8-bit-per-pixel image, then 256 shades of a single color may be used to represent pixels in that image. Thus, T1 may be set to a value such as 190 or 200 to identify significant pixels intensity gradients. The second parameter T2 establishes the total number of perimeter pixels 88 that must differ from the center pixel 86 by the specified intensity difference T1 in order for the center pixel 86 to be classified as an edge pixel. These parameters may be designed into the edge classification technique or they may be adjustable by an end user through one of the aforementioned user interfaces.

The edge classification technique proceeds to initialize running variables X and Y in step 804. Here, the variable X represents the total number of perimeter cells 88 in window 80 and Y represents the number of pixels under the perimeter cells 88 that differ from the pixel under center cell 86 by the specified intensity difference T1. As indicated above, this difference is not absolute, but is instead signed. This signed difference is represented at decision step 806, where the routine determines whether the intensity IP(X) of perimeter pixel (88) P(X) is greater than the intensity IC of center pixel 86 by an amount that exceeds intensity difference T1. If the intensity difference exceeds this parameter T1, the variable Y is incremented at step 808. Regardless of whether the intensity difference satisfies the expression in step 806, the routine proceeds to the next perimeter cell 88 by incrementing variable X at step 810. The routine proceeds in a similar manner until all perimeter pixels 88 have been compared to the center pixel 86. In the embodiment shown, the routine breaks out of this loop when the variable X has reached the maximum number of perimeter cells 88 (e.g., eight for a 3×3 window) in the window 80 (step 812). Then at step 814, the variable Y is compared against the second parameter T2. If Y exceeds T2, the pixel under the center cell 86 is classified as an edge pixel in step 816. The edge classification routine ends at step 818, at which point the edge enhancement algorithm can proceed to the next pixel of interest and the process shown in FIG. 8 can be repeated. Note that the variable T2 may have a value as small as 0. Larger values for T2 may be used to identify either horizontal or vertical edges. Intermediate values for T2 may be used to identify object corners. Very large values for T2 approaching the total number of perimeter cells 88 in a window 80 may have the effect of classifying small isolated features such as line ends or dots. Accordingly, the parameter T2 may be adjusted as desired to produce different effects.

Figure 9:
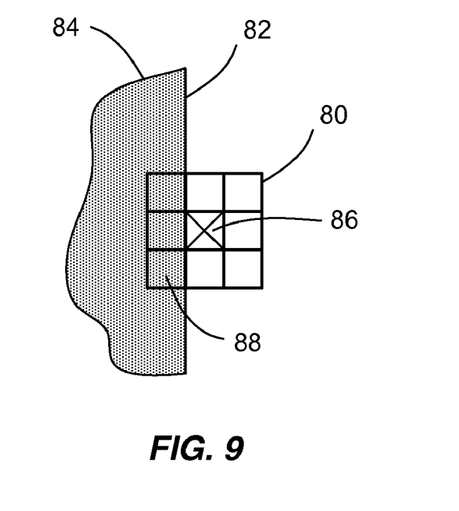
FIG. 9 is a schematic illustration of a window that is used to classify image elements on a given side of a color intensity transition according to one embodiment.
Figure 10:
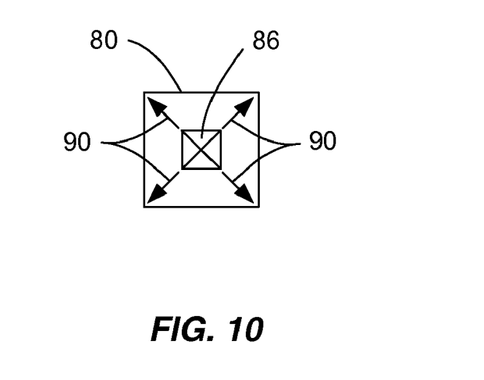
FIG. 10 is a schematic illustrating a color intensity gradient within a window that is used to classify image elements on a given side of a color intensity transition according to one embodiment.

In embodiments described above, the edge classification routine identified pixels located on a dark side of a dark-to-light transition. The edge classification routine shown in FIG. 8 may be modified to identify pixels located on the light side of such a transition by using the decision step 820 shown in a dashed line representation. In this alternative embodiment, the edge classification routine determines whether the intensity IC at center pixel 86 is greater than the intensity IP(X) of perimeter pixel (88) P(X) by an amount that exceeds intensity difference T1. Stated another way, the edge classification routine classifies edge pixels according to whether the center pixel 86 is lighter than one or more perimeter pixels 88. This situation is also represented in FIGS. 9 and 10, which are similar to FIGS. 5 and 7. However, in FIG. 9, the center cell 86 is positioned on the light side of the transition 82. Presumably, if the intensity of the pixel under cell 86 exceeds that of the pixel under perimeter cell 88, the pixel of interest may be classified as an edge pixel. FIG. 10 is similar to FIG. 7 except for the orientation of the arrows 90 to signify a different direction for the intensity gradient that is used to identify pixels at the light side of a transition 82. That is, this embodiment of the edge classification routine identifies light-to-dark transitions as identified by the arrows 90.

Figure 11:
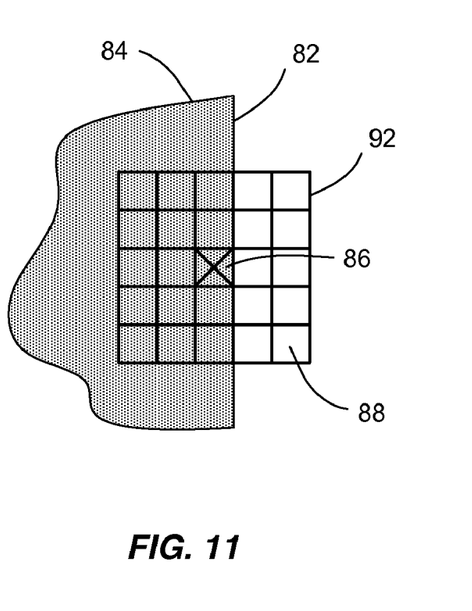
FIG. 11 is a schematic illustration of a window that is used to classify image elements on a given side of a color intensity transition according to one embodiment.
Figure 12:
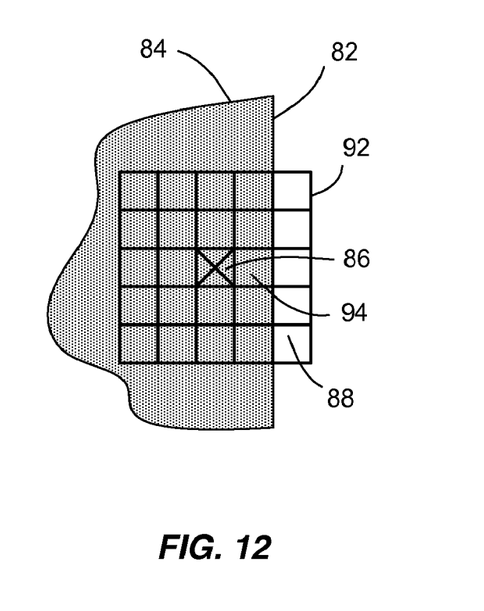
FIG. 12 is a schematic illustration of a window that is used to classify image elements on a given side of a color intensity transition according to one embodiment.

FIGS. 11 and 12 illustrate an alternative edge classification technique that uses a larger K×K window 92. In the embodiment shown, a 5×5 window 92 is used to classify pixels as edge pixels. As with the embodiment shown in FIG. 5, this particular window 92 is adapted to identify edge pixels adjacent to the dark-to-light edge 82. In FIG. 11, the pixel under the center cell 86 is dark as compared to lighter pixels positioned under the perimeter cell 88. However, the larger window 92 allows pixels disposed away from the edge 82 to be classified as edge pixels. For example, FIG. 12 shows that the pixel of interest under center cell 86 is at least one cell 94 away from the edge 82. If the pixels under the perimeter cells 88 are sufficiently light as compared to the pixel under center cell 86, then the pixel of interest may be classified as an edge pixel. Thus, the larger window 92 may be used to identify and classify more edge pixels near an edge 82 as compared to smaller windows 80. Object images 402a and 402b in FIG. 4 illustrates the effects of the window size on the number of classified edge pixels.

In the above described edge classification examples, a single threshold is used to determine whether the difference in intensity between a center 86 pixel and a perimeter 88 pixel exceeds a predetermined value. In an alternative embodiment, a different threshold may be applied depending on the position of the perimeter pixel. For instance, pixels at the corners of the K×K window may have a different associated threshold than other perimeter pixels. In one embodiment, the threshold may consider the distance between the perimeter pixel and the center pixel. That is, for perimeter 88 pixels, the threshold may vary in relation to the distance between that pixel and the center 86 pixel. In one embodiment, the threshold may include a square root of two adjustment.

Figure 13:
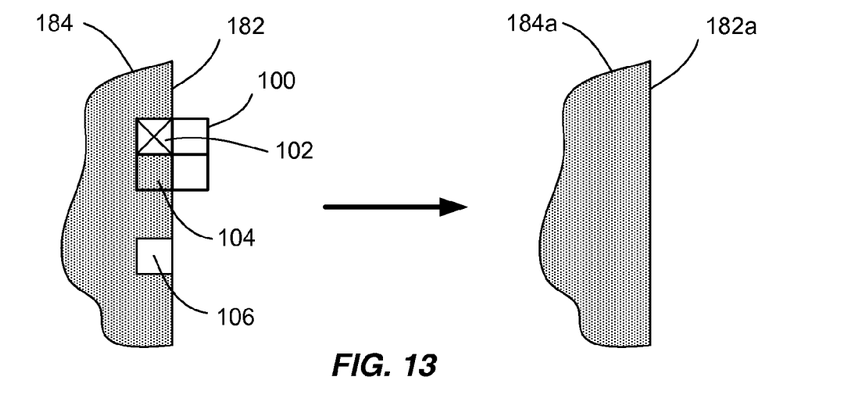
FIG. 13 is a schematic illustration of a dilation filter applied to image elements near a color transition according to one embodiment.
Figure 14:
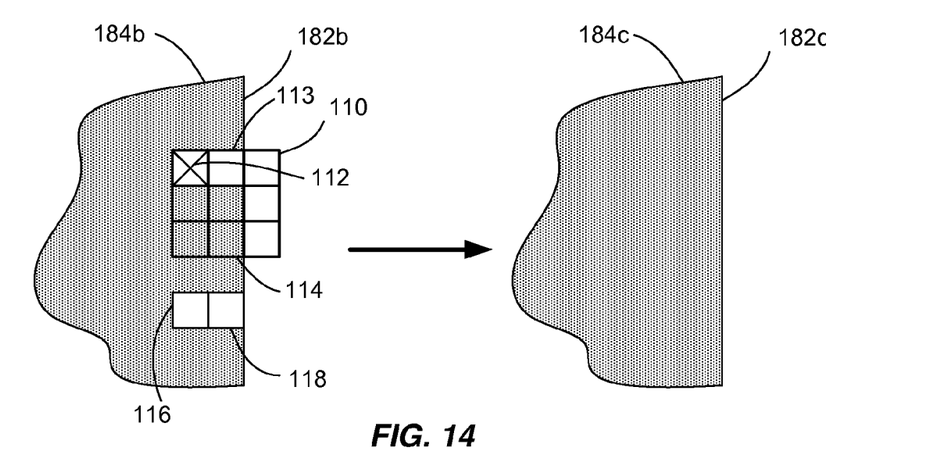
FIG. 14 is a schematic illustration of a dilation filter applied to image elements near a color transition according to one embodiment.
Figure 15:
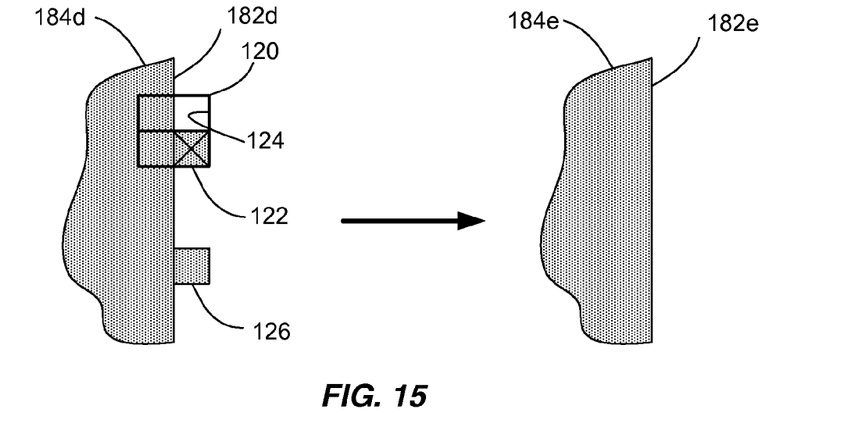
FIG. 15 is a schematic illustration of an erosion filter applied to image elements near a color transition according to one embodiment.

Once the edge pixels are classified according to process steps 304 and 306 in FIG. 3, the morphological filter is applied at step 312 to those pixels in the corresponding halftone image 310. FIGS. 13, 14, and 15 illustrate various examples of dilation and erosion filters applied to these edge pixels. Specifically, FIG. 13 shows an edge transition 182 and object 184 that each correspond to edge 82 and object 84 in the grayscale image shown in FIG. 5 for example. The image represented in FIG. 13 is a halftone image and accordingly includes pixels, dots, or other image elements with an intensity that is represented by a single bit. Thus, the image elements are either ON or OFF. The convention used herein assigns the label ON to dark pixels or pixels with the lower intensity since it is these pixels where colorant is applied. In contrast, the label OFF represents light pixels or background pixels where no colorant is applied. Those skilled in the art will understand that the opposite naming convention may be used.

In FIG. 13, a dilation filter using an M×M window is applied to turn edge pixels ON. Specifically, FIG. 13 shows a 2×2 window 100 that is moved from edge pixel to edge pixel. The window 100 comprises one cell 102 that is positioned over the current edge pixel. The dilation filter examines the other three cells in the window 100 and determines that the pixel under cell 104 is ON. Since at least one other pixel within the 2×2 window 100 is ON, the dilation filter turns the current pixel under cell 102 ON as indicated by the enhanced object 184a on the right side of FIG. 13. The dilation filter continues this process, ultimately proceeding to edge pixel 106, which is also OFF in the halftone object 184. This edge pixel 106 is also turned ON by the dilation filter, which results in a substantially uniform transition 182a in the enhanced object 184a. In addition, since the edge pixels in the present example are limited to the "dark" side of the transition 182, the overall size of the enhanced object 184a remains substantially the same as the original halftone object 184 and the original grayscale image 84 from FIG. 5.

FIG. 14 illustrates an alternative dilation filter using a larger M×M window 110. The larger M×M window 110 may be appropriate for cases where larger edge classification windows 92 (from FIGS. 11 and 12) are used. This is because more edge pixels may be present. In addition, more of these edge pixels may be located away from the dark-to-light transition 182b. For example, pixel 118 may be located adjacent to the transition 182b while pixel 116 may be located one or more pixels away from the transition 182b. Accordingly, FIG. 14 shows a 3×3 dilation window that is capable of turning pixels 116 and 118 ON if appropriate. Larger dilation windows may be used.

The operation of the dilation filter shown in FIG. 14 is substantially the same as described for the embodiment in FIG. 13. The dilation filter examines the other cells in the window 110 and determines that at least pixel under cell 114 is ON. In fact, multiple pixels within window 110 are ON. Since at least one other pixel within the 3×3 window 110 is ON, the dilation filter turns the current pixel under cell 112 ON as indicated by the enhanced object 184c on the right side of FIG. 14. The dilation filter continues this process, ultimately proceeding to other OFF edge pixels, including pixels 113, 116, 118. These edge pixels 113, 116, 118 are also turned ON by the dilation filter, which results in a substantially uniform transition 182c in the enhanced object 184c. As above, since the edge pixels in the present example are limited to the "dark" side of the transition 182b, the overall size of the enhanced object 184c remains substantially the same as the original halftone object 184b and the original grayscale image 84 from FIGS. 11 and 12.

In alternative embodiments, the edge enhancement algorithm may use an erosion filter at step 312 of FIG. 3. Erosion filters may be appropriate if the edge pixels classified in steps 304, 306 of FIG. 3 are located on the light side of a light-to-dark transition. Thus, FIG. 15 shows one embodiment of an erosion filter using a 2×2 window 120. As with the dilation filters described above, larger windows may be appropriate for a given implementation. In the present example, the 2×2 window 120 is moved from edge pixel to edge pixel. In the present embodiment, the edge pixels (e.g., pixel 126) are located on a light side of the light-to-dark transition 182d. The window 120 comprises one cell 122 that is positioned over the current edge pixel. The erosion filter examines the other three cells in the window 120 and determines that the pixel under cell 124 is OFF. Since at least one other pixel within the 2×2 window 120 is OFF, the erosion filter turns the current pixel under cell 122 OFF as indicated by the enhanced object 184e on the right side of FIG. 15. The erosion filter continues this process, ultimately proceeding to edge pixel 126, which is also ON in the halftone object 184d. This edge pixel 126 is also turned OFF by the erosion filter, which results in a substantially uniform transition 182e in the enhanced object 184e. In addition, since the edge pixels in the present example are limited to the "light" side of the transition 182d, the overall size of the enhanced object 184e remains substantially the same as the original halftone object 184d and the original grayscale image 84 from FIG. 9.

Figure 16:
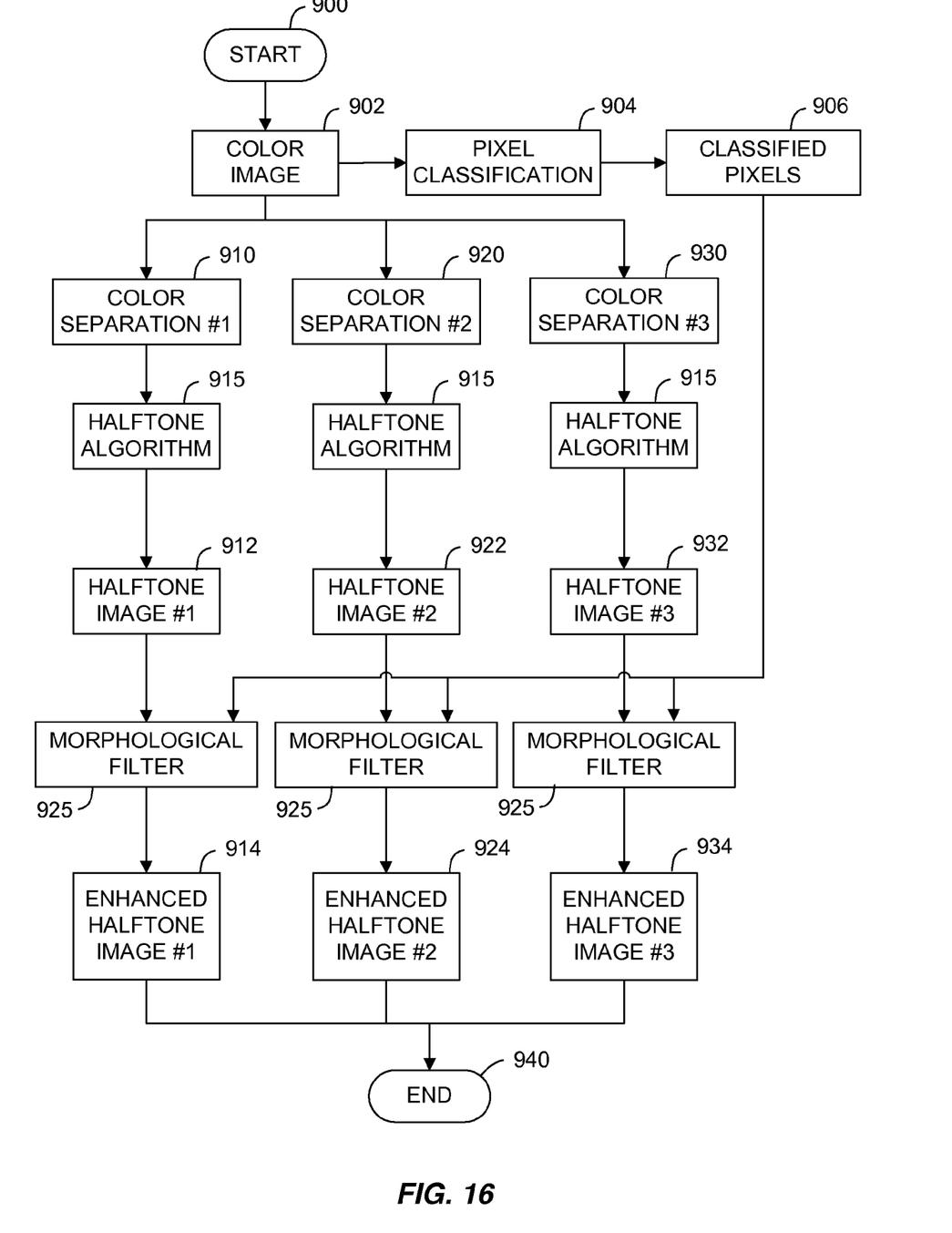
FIG. 16 is a flow diagram illustrating one embodiment for carrying out the halftone image enhancement technique.

In embodiments described above, edge pixels were classified from a grayscale image. In an alternative approach, the edge pixels may be identified and classified from a color image prior to segmentation into the various color planes and subsequent halftoning. FIG. 16 shows a flow diagram illustrating one method carrying out this approach. The process begins at step 900 with a full color image 902. Digital color images are often represented in terms of a color model. For instance, a luminance-chrominance model is one appropriate model. As such, the process illustrated in FIG. 9 will be described using a Y-Cb-Cr color model, though it should be understood that other luminance-chrominance models such as LAB, LUV, YIQ, and YUV may be equally applicable. Thus, once an original image is obtained in step 902, the image may be converted, if necessary, into the appropriate color model to represent each pixel as a group of intensity values conforming to the color model. Note, images stored using the JPEG standard (*.jpg extension) are represented using a luminance-chrominance model and may not need to be converted in step 902.

Other color models use three distinct colors, such as Red, Green, and Blue or Cyan, Magenta, and Yellow. In the former case, the image may be converted into a luminance chrominance model for edge enhancement processing using FIG. 9. Alternatively, the color image may be converted directly into a three-color model corresponding to the printer capabilities in image forming device 10 with each color layer processed according to the process shown in FIG. 3.

In the Y-Cb-Cr colorspace model, the Y component corresponds to the perceived brightness of the pixel, which is independent of the color or hue of the pixel. Color information is represented by the two remaining chrominance quantities, Cb and Cr. Each of the three components may be represented by multiple values. Some common ranges include 8-bits, 16-bits, and 24-bits per pixel. For example, with an 8-bit per pixel color depth, the Y component may be represented by numbers in the range between 0 and 255 while the Cb and Cr components may be represented by numbers in the range between −128 and +127. Each color component is color neutral or lacking color at a value of zero. Since the perceived brightness information is contained within the Y-component, edge enhancement of a color image that is printed on a monochrome printer may be accomplished by processing the Y-component alone according to the process shown in FIG. 3.

For color printing with a luminance-chrominance model, edge pixels may be classified in step 904 from the luminance component of the color image 902 to produce a list, array, or image of pixels 906 satisfying the thresholding procedures disclosed herein. Embodiments of the edge classification are illustrated in FIG. 8. Once the edge pixels 906 are classified, the color image is converted into three color separations 910, 920, 930 compatible with the printer capabilities of image forming device 10. In many cases, the color separations 910, 920, 930 include Cyan, Magenta, and Yellow color layers though other colors may be used in different printers.

A halftone algorithm 915 is applied to each of the three color separations 910, 920, 930 to produce one-bit per pixel halftone images 912, 922, 932, respectively. A common halftone algorithm 915 may be used for each color separation. Alternatively, different halftone algorithms 915 may be used for each color separation. Each halftone image 912, 922, 932 is then processed by a morphological filter 925 applied at each of the edge pixels 906 identified in step 904. A common morphological filter 925 may be used for each halftone image 912, 922, 932. Alternatively, different morphological filters 925 may be used for each halftone image 912, 922, 932. For example, each morphological filter 925 may use the same size M×M window or different size N×N windows to perform dilation or erosion operations. Once the appropriate morphological filter 925 is applied to each halftone image 912, 922, 932, the edge enhancement routine ends (step 940) and a full set of enhanced halftone images 914, 924, 934 are available for printing by a color image forming device 10.

The edge enhancement techniques may be carried out in other specific ways than those herein set forth without departing from the scope and essential characteristics of the embodiments disclosed above. For instance, various process steps described above have been presented in terms of pixel processing or pixel color depths. Pixels are certainly known in the art as a representative digital sample of an image. Pixels may encompass dots, squares, or other regions of an image. Furthermore, halftone images are often represented in terms of halftone screens that may or may not have the same resolution as pixels in an original image. However, the resolution conversions are known. Thus, a morphological filter may be applied to elements in a halftone image corresponding to the same spatial locations as the edge pixels classified in FIG. 8. Therefore, those skilled in the art should comprehend that the embodiments described herein may be applied generically to image elements, including but not limited to pixels, dots, squares, regions, and subpixels.

In addition, embodiments described above have classified pixels in an original image into two categories: edge pixels and non-edge pixels. In an alternative approach, pixels may be classified into different categories of edge pixels, such as hard, soft, or isolated edge pixels. For example, a hard edge pixel may be classified using large intensity gradient thresholds while a soft edge pixel may be classified using smaller intensity gradient thresholds. As suggested above, isolated edge pixels may be identified by observing intensity gradients in multiple directions.

Edge pixels classified into multiple categories may be processed with different morphological filters. For instance, a relatively large K×K filter window may be used with hard edge pixels to increase the aggressiveness of the morphological filter. By comparison, a smaller M×M filter window may be applied to soft edges to decrease the aggressiveness of the morphological filter. Isolated edge pixels may be removed completely.

In other embodiments, the dilation filters may be changed to require more than a single ON dot to dilate an edge pixel of interest. Similarly, an erosion filter may be changed to require more than a single OFF dot to erode an edge pixel of interest. Accordingly, the present embodiments are to be considered in all respects as illustrative and not restrictive, and all changes coming within the meaning and equivalency range of the appended claims are intended to be embraced therein.

What is claimed is:

1. A method of processing a digital image for production by an image forming device, the digital image comprising a plurality of elements, each element characterized by a range of pixel intensities represented in a first color depth, the method comprising:

for each element in the digital image, determining if the magnitude of a pixel intensity gradient between an element of interest in a first window applied at each element and other elements in the first window satisfies a first predetermined condition;

classifying those elements satisfying the first predetermined condition in a first category;

creating a duplicate image by reducing the color depth of said digital image to a second color depth;

applying a filter to elements of the duplicate image corresponding to those elements that are classified in the first category using a second window.

2. The method of claim 1 wherein applying the filter to elements of the duplicate image corresponding to those elements that are classified in the first category using the second window comprises exclusively applying the filter only to those elements of the duplicate image corresponding to those elements that are classified in the first category.

3. The method of claim 1 further comprising classifying those elements satisfying a second predetermined condition in a second category.

4. The method of claim 3 further comprising applying a second filter to elements of the duplicate image corresponding to those elements that are classified in the second category using a third window.

5. The method of claim 1 wherein the first predetermined condition is when a signed intensity difference between the element of interest in the first window and a predetermined number of other elements in the first window exceeds a predetermined intensity difference.

6. The method of claim 1 wherein applying the filter comprises dilating elements of the duplicate image corresponding to those elements that are classified in the first category if other elements in the second window are ON.

7. The method of claim 1 wherein applying the filter comprises eroding elements of the duplicate image corresponding to those elements that are classified in the first category if other elements in the second window are OFF.

8. The method of claim 1 wherein the duplicate image is a halftone image.

9. The method of claim 1 wherein the digital image is a color image.

10. The method of claim 1 wherein the digital image is a grayscale image.

11. The method of claim 1 wherein the filter is a morphological filter.

12. A computer readable medium which stores computer-executable process steps for enhancing edges in halftone images prior to production by an image forming device, said computer-executable process steps causing a computer to perform the steps of:

for each element in the digital image, determining if the magnitude of a pixel intensity gradient between an element of interest in a first window applied at each element and other elements in the first window satisfies a first predetermined condition;

classifying those elements satisfying the first predetermined condition in a first category;

creating a halftone image by reducing the color depth of said digital image to a single bit per element;

exclusively applying a morphological filter to elements of the halftone image corresponding to those elements that are classified in the first category using a second window.

13. The computer readable medium of claim 12 wherein the first predetermined condition is when a signed intensity difference between the element of interest in the first window and a predetermined number of other elements in the first window exceeds a predetermined intensity difference.

14. The computer readable medium of claim 12, wherein the morphological filter is a dilation filter.

15. The computer readable medium of claim 12, wherein the morphological filter is an erosion filter.

16. The computer readable medium of claim 12 wherein the duplicate image is a halftone image.

17. The computer readable medium of claim 12 wherein the digital image is selected from a group consisting of a color image and a grayscale image.

18. A method of halftoning a digital image for production by an image forming device, the method comprising:

identifying a first set of edge elements in a digital image having a color depth greater than one bit per element;

creating a halftone image from the digital image, the halftone image having a color depth of one bit per element and further having a second set of edge elements corresponding to the first set of edge elements; and selectively applying a morphological filter to the second set of edge elements to reduce the effects of color depth reductions;

wherein the first set of edge elements comprises individual elements located at an object edge and at a color intensity transition in the digital image, the individual elements being located on one side of the object edge and on one side of the color intensity transition, wherein the first set of edge elements and the corresponding second set of edge elements are located at a substantially similar locations in the digital and halftone images, respectively.

* * * * *

UNITED STATES PATENT AND TRADEMARK OFFICE
CERTIFICATE OF CORRECTION

PATENT NO. : 7,602,531 B2 Page 1 of 1
APPLICATION NO. : 11/277190
DATED : October 13, 2009
INVENTOR(S) : Bailey et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 775 days.

Signed and Sealed this

Fifth Day of October, 2010

David J. Kappos
*Director of the United States Patent and Trademark Office*